US006909447B2

(12) United States Patent
Kawaguchi et al.

(10) Patent No.: US 6,909,447 B2

(45) Date of Patent: Jun. 21, 2005

(54) RECORDING APPARATUS

(75) Inventors: Koichiro Kawaguchi, Kanagawa (JP); Noriyuki Sugiyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 242 days.

(21) Appl. No.: 10/214,586

(22) Filed: Aug. 9, 2002

(65) Prior Publication Data

US 2003/0030712 A1 Feb. 13, 2003

(30) Foreign Application Priority Data

Aug. 10, 2001 (JP) ....................................... 2001-243503

(51) Int. Cl.[7] .......................... G01D 15/24; B41J 29/38; B41J 2/01

(52) U.S. Cl. .......................... 347/218; 347/16; 347/104

(58) Field of Search ................................ 347/218, 104, 347/16, 4, 2; 271/9.09, 118, 145, 171; 400/198, 225, 624

(56) References Cited

U.S. PATENT DOCUMENTS 5,166,883 A * 11/1992 Gilham ....................... 705/406
5,725,206 A 3/1998 Sugiyama .................. 271/9.09
5,775,823 A 7/1998 Bekki et al. ................ 400/629
5,813,783 A * 9/1998 Takatori .................. 400/636.2
5,982,400 A 11/1999 Yokoi et al. ................ 346/134
6,092,893 A 7/2000 Yokoi et al. ................ 347/104
6,106,114 A 8/2000 Sugiyama ................... 347/104
6,170,817 B1 1/2001 Kawaguchi ................. 271/167
6,217,143 B1 * 4/2001 Munakata et al. ............ 347/16
6,328,394 B1 * 12/2001 Shirai et al. ................... 347/2

* cited by examiner

*Primary Examiner*—K. Feggins

(74) *Attorney, Agent, or Firm*—Fitzpatrick, Cella, Harper & Scinto

(57) ABSTRACT

A recording apparatus for recording on a recording sheet by recording means comprises a conveying roller for conveying a recording sheet on the upstream side of recording means in the recording sheet conveying direction, plural discharging rollers for conveying a recording sheet on the downstream side of recording means in the recording sheet conveying direction, and a common driving source for driving the plural discharging rollers. For this recording apparatus the driving force of the driving source is transmitted first to a discharging roller on the outermost downstream side in the recording sheet conveying direction. With the structure thus arranged, this recording apparatus is capable of forming images in good condition on the rear portion of a recording sheet by enhancing the conveyance precision only by use of discharging rollers without any significant cost increase for a recording apparatus provided with plural discharging rollers.

29 Claims, 7 Drawing Sheets

RECORDING APPARATUS

BACKGROUND OF THE INVENTION

1. Field of the Invention

The present invention relates to a recording apparatus provided for facsimile equipment, a copying machine, a printer, and the like. More particularly, the invention relates to the structure that drives discharging rollers of a recording sheet for the recording apparatus.

2. Related Background Art

FIG. 9 is a view that shows the structure of the conventional carrier mechanism used in general for a recording sheet. In FIG. 9, a conveying roller 13 and a pinch roller 18 are arranged to pinch a recording paper that serves as recording sheet, for example, and a recording head 11, which is installed on the downstream side of the conveying roller 13 in the sheet conveying direction X, performs recording. Then, a first discharging roller 16 and a second discharging roller 17, which are arranged on the downstream side of the recording head 11 in the sheet conveying direction X, expel the recording sheet.

Here, the driving force (or driving power) or of a motor 14 is transmitted to the conveying roller 13. Further, the first discharging roller 16 and the second discharging roller 17 are fixed to a platen (not shown). Then, the driving force is transmitted to the first discharging roller 16 and the second discharging roller 17 from the carrier gear 13*a* provided for one end of the conveying roller 13 through transmission gears 21 and 22.

In the structure shown in FIG. 9, two discharging rollers are used to obtain the stabilized posture of a recording sheet after the trailing end of the recording sheet has passed the conveying roller 13.

Conventionally, there has been a difference in the conveyance precision between the area where the recording sheet is conveyed by use of the conveying roller and the area where the recording sheet is conveyed by use of only the discharging roller. Conventionally, the text printing and graphic printing have been the main operations in outputting images, and the difference in such conveyance precision has not presented any serious problem. However, with the enhancement of image quality of a recording apparatus in recent years, there is intensified a tendency to record picture images up to the maximum recordable area of a recording sheet. Along with this tendency, it has been desired to improve the conveyance precision of a recording sheet in the area where the recording sheet is conveyed only by use of the discharging roller so as to make the difference in the sheet conveyance precision smaller between this area and the areas where the recording sheet is conveyed by the conveying roller.

However, in the conventional example described above, the discharging roller is arranged in a position far away from the driving source. As a result, the number of gears needed for transmitting driving force from the driving source to the discharging roller becomes larger inevitably. Under the such circumstances, particularly in the structure having a plurality of discharging rollers arranged in the sheet conveying direction, it has not been realized to obtain the feed precision sufficiently satisfactory for the discharging roller positioned on the outermost downstream side in the sheet conveying direction, whereas this feed precision dominantly determines the conveyance precision of a recording sheet by use of the discharging rollers.

SUMMARY OF THE INVENTION

It is an object of the present invention to provide a recording apparatus capable of forming images in good condition on the rear portion of a recording sheet by enhancing the conveyance precision only by use of discharging rollers without any significant cost increase for a recording apparatus provided with plural discharging rollers.

It is another object of the invention to provide a recording apparatus for recording on a recording sheet by recording means, which comprises: a conveying roller for conveying a recording sheet on the upstream side of recording means in the recording sheet conveying direction; plural discharging rollers for conveying a recording sheet on the downstream side of recording means in the recording sheet conveying direction; and a common driving source for driving the plural discharging rollers; and in which the driving force (or driving power) of the driving source is transmitted first to a discharging roller on the outermost downstream side in the recording sheet conveying direction.

BRIEF DESCRIPION OF THE DRAWINGS

DETILED DESCRIPTION OF THE PREFERRED EMBODIMENTS

Hereinafter, with reference to the accompanying drawings, the description will be made of the embodiments in accordance with the present invention.

First Embodiment

Figure 1:
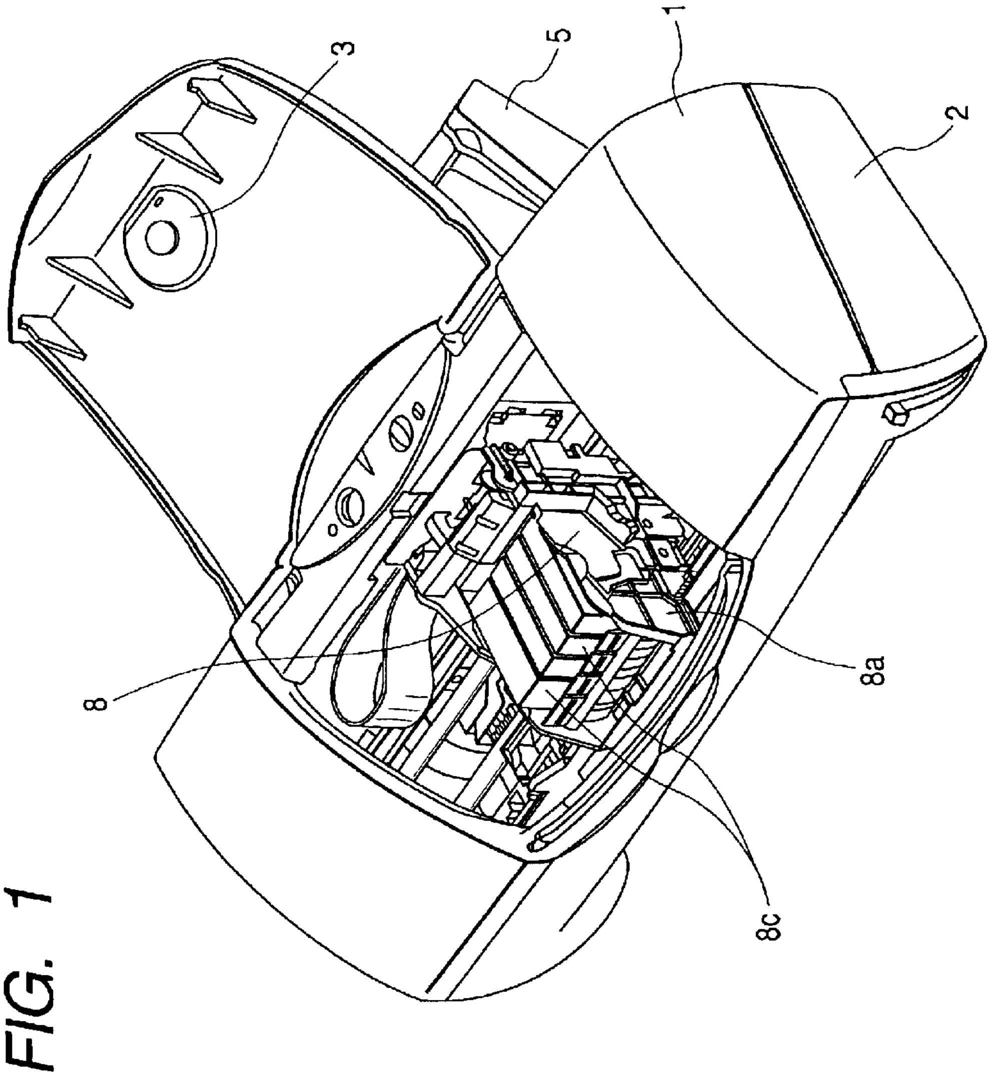
FIG. 1 is a perspective view that shows a recording apparatus with a movable cover member being open, in accordance with a first embodiment of the present invention.
Figure 2:
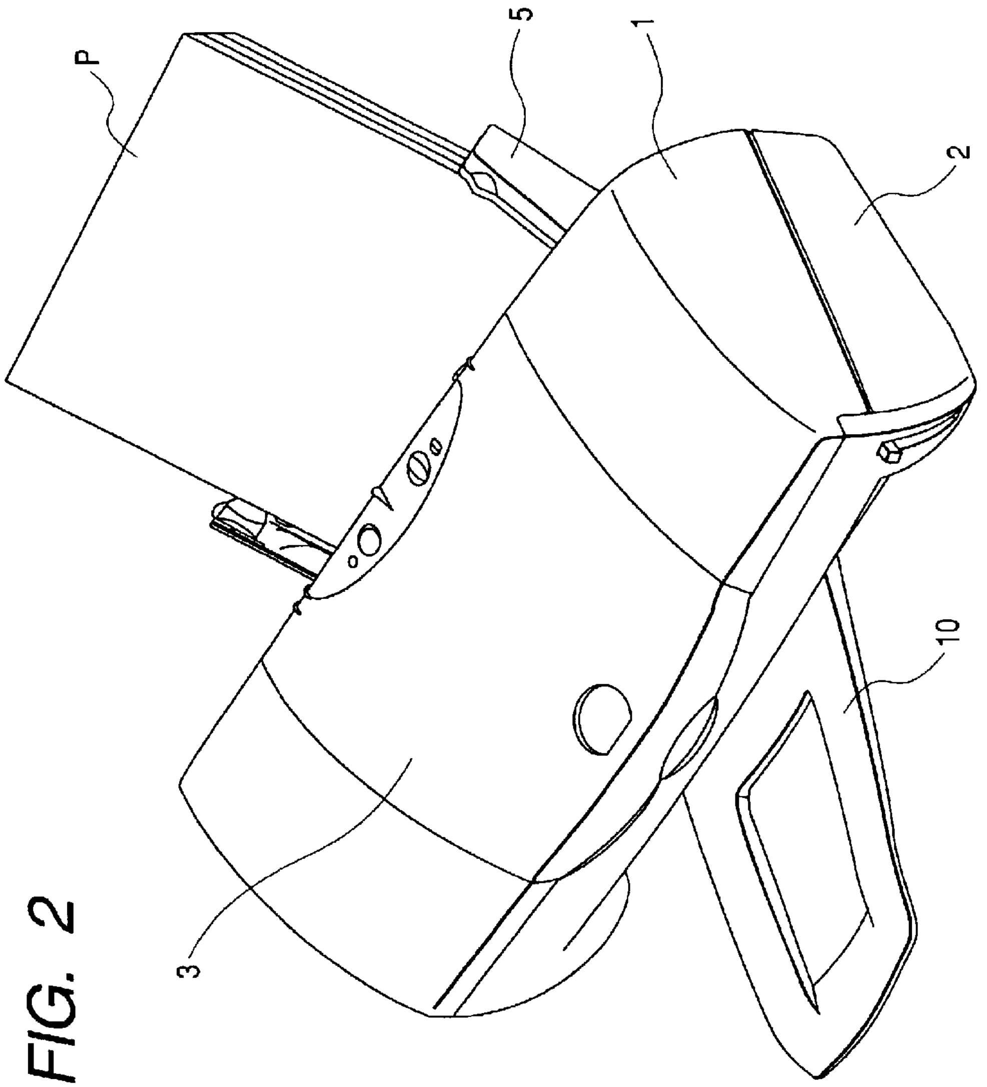
FIG. 2 is a perspective view that shows the recording apparatus represented in FIG. 1 with the movable cover member being closed.
Figure 3:
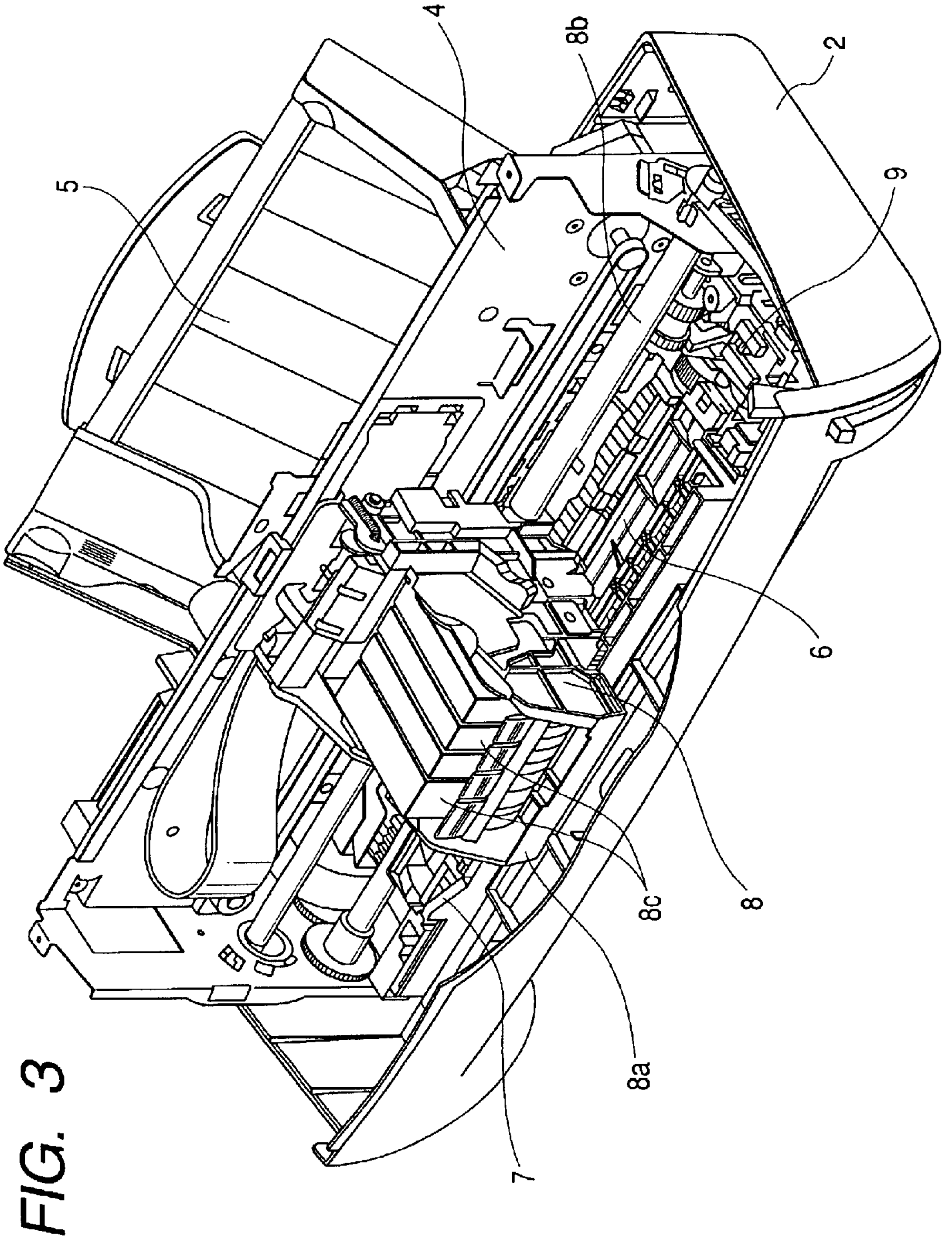
FIG. 3 is a perspective view that shows the inner structure of the recording apparatus represented in FIG. 2.
Figure 4:
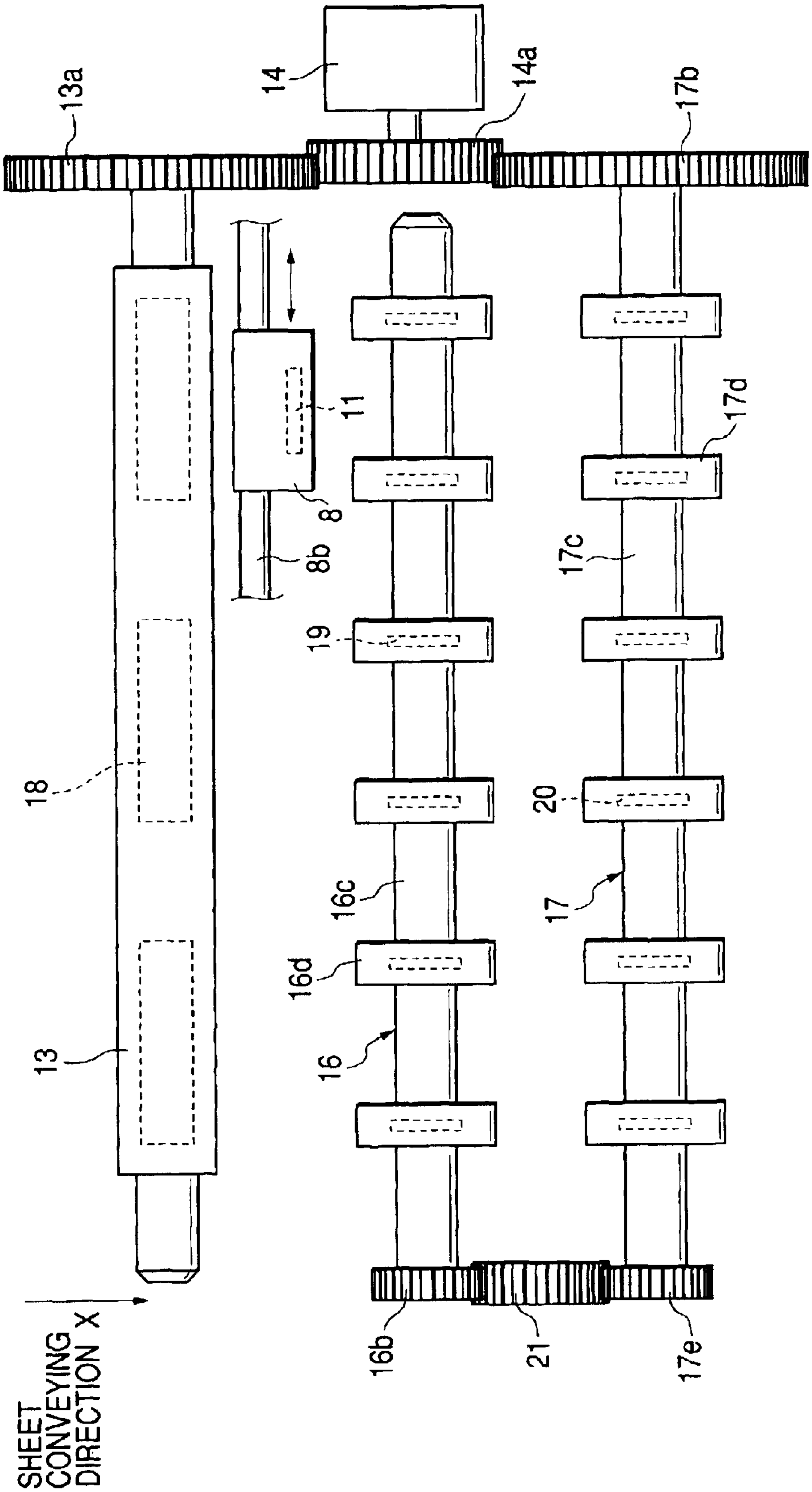
FIG. 4 is a plan view that shows the conveying unit and discharging unit of the recording apparatus in accordance with the first embodiment of the present invention.
Figure 5:
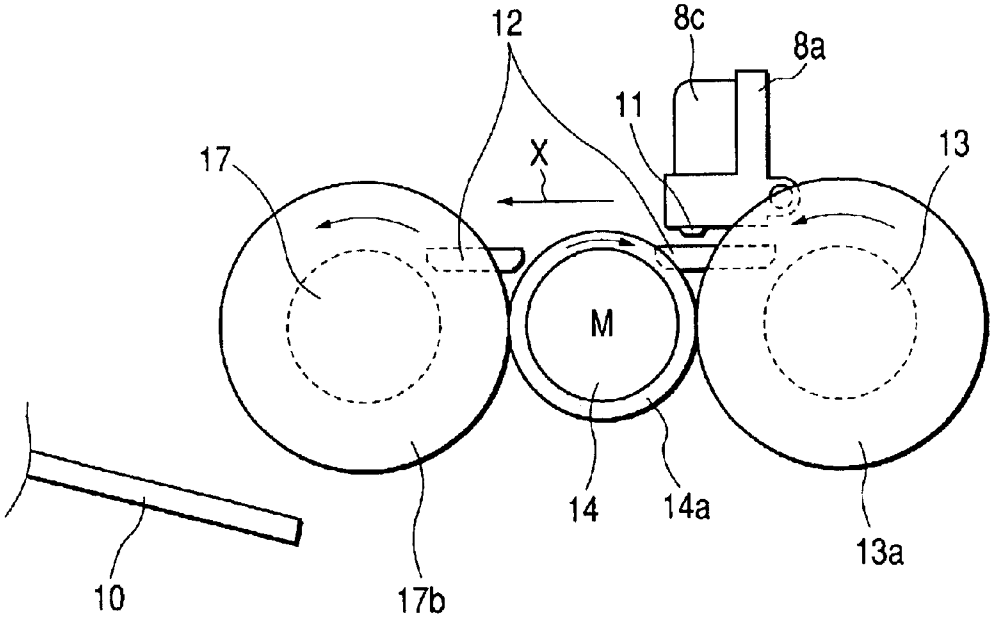
FIG. 5 is a cross-sectional view that shows the conveying unit and discharging unit of the recording apparatus in accordance with the first embodiment of the present invention.
Figure 6:
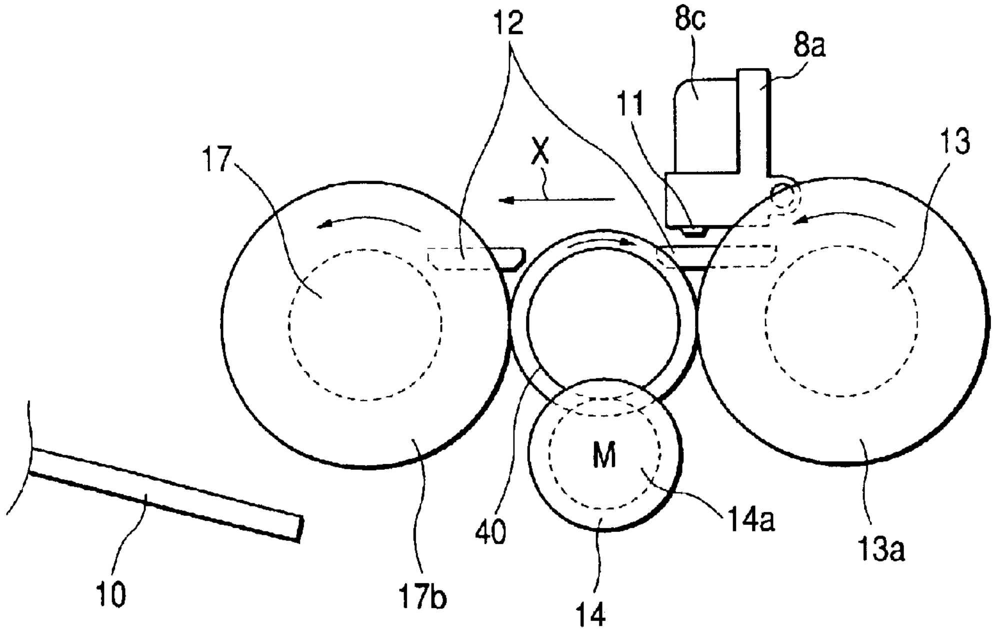
FIG. 6 is a cross-sectional view that shows the conveying unit and discharging unit of the recording apparatus in accordance with a modified example of the first embodiment of the present invention.
Figure 7:
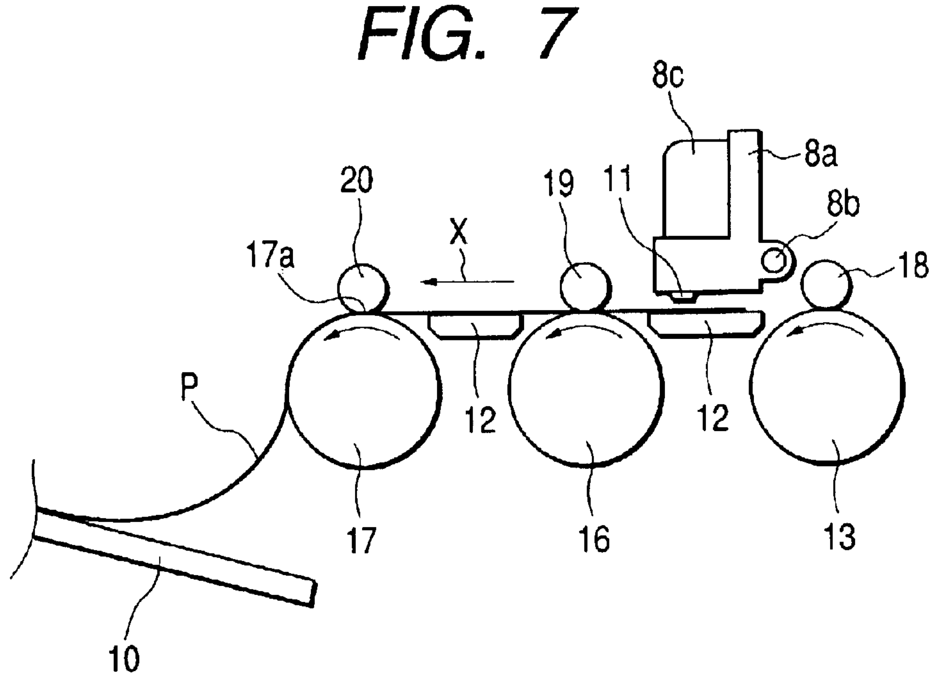
FIG. 7 is a cross-sectional view that illustrates the principle of the enhancement of conveyance precision only by use of the discharging roller in accordance with the present invention.

Here, with reference to FIG. 1 to FIG. 7, an ink jet recording apparatus is exemplified for the description of a first embodiment of the present invention. FIG. 1 is a perspective view that shows a recording apparatus with a movable cover member being open, in accordance with a first embodiment of the present invention. FIG. 2 is a perspective view that shows the recording apparatus represented in FIG. 1 with the movable cover member being closed. FIG. 3 is a perspective that shows the inner structure of the recording apparatus represented in FIG. 2. FIG. 4 is a plan view that shows a conveying unit and a discharging unit of the recording apparatus in accordance with the first embodiment of the present invention. FIG. 5 to FIG. 7 are cross-sectional views that schematically illustrate the conveying unit and the discharging unit of the recording apparatus in accordance with the first embodiment of the present invention.

At first, the entire structure of the apparatus will be described. Then, the structure of a discharging roller for discharging a recording sheet will be described.

As shown in FIG. 1 and FIG. 2, a recording apparatus main body is covered with 1 main case 1 and 2 bottom case 2. The cases 1 and 2 are fixed to a part of the frame of the recording apparatus to form a fixed covering portion. With this case, the recording sheet conveying unit and a recovery unit, that will be described later, are covered. Also, for a part of the main case 1, an opening portion is formed, and an access cover 3 is fixed to cover this opening portion. The access cover 3 is rotatively fixed to the main case 1 to form a movable cover member. As shown in FIG. 1, by opening the access cover 3, it becomes possible to make access to a carriage unit that will be described later so as to execute head replacement or ink tank replacement.

Inside the cover, the recording apparatus main body is incorporated as shown in FIG. 3. In FIG. 3, a reference numeral 4 designates a chassis that provides the apparatus frame. The main case 1 and the bottom case 2 are fixed to the chassis 4.

Also, for this recording apparatus, a feeding unit 5 is provided, and a plurality of sheets P yet to be recorded is stacked in here, and a feed roller (not shown) rotates to separate sheets P one by one for feeding in accordance with a starting signal of recording. Then, by a conveying means formed by a conveying unit 6, which is structured by a conveying roller and a pinch roller, and a discharging unit 7, which is structured by a discharging roller and a spur, the recording sheet is conveyed through the recording area and discharged to the outside.

Also, in the recording area, a carriage unit 8 is provided as a recording means, and performs a designated recording on the sheet P, which is being conveyed. For the present embodiment, the so-called ink jet recording method of serial type, in which the recording head reciprocates in the direction intersecting with the direction of recording sheet conveyance, and records lines one by one. A carriage 8*a* is installed so as to reciprocate along a guide shaft 8*b*, and the recording head 11 and an ink tank 8*c* are mounted on this carriage 8*a*. Then, in synchronism with the movement of the carriage 8*a*, the recording head 11 ejects ink to record images on the sheet P conveyed to the recording area. In this respect, a recovery unit 9 is arranged on the end portion of the traveling area of the carriage 8*a* to face the recording head 11, which sucks ink from the recording head before the initiation of recording, on the way of recording, or the like or conducts pre-ejection so as to carry out recording without ink ejection failure.

Then, the recording sheet is discharged by use of the discharging unit 7 after recording, and as shown in FIG. 2, recording sheets are discharged one after another and stacked on a discharging tray 10 that receives discharged sheets, which is detachably installed on the bottom case 2 below the discharging unit 7.

Here, the description of the present embodiment is made using the ink jet recording method of serial type as has been described above. However, the present invention is not necessarily limited thereto. The invention is equally applicable to the ink jet recording apparatus of full-line type in which recording is performed by the recording head provided with an orifice array having the same width as the width in the direction intersecting with the conveyance direction of recording sheet. Also, the invention is not necessarily limited to the ink jet recording method. The driving mechanism of the recording sheet discharging roller of the present invention is applicable to the thermal transfer method, the laser method, and so on.

Figure 9:
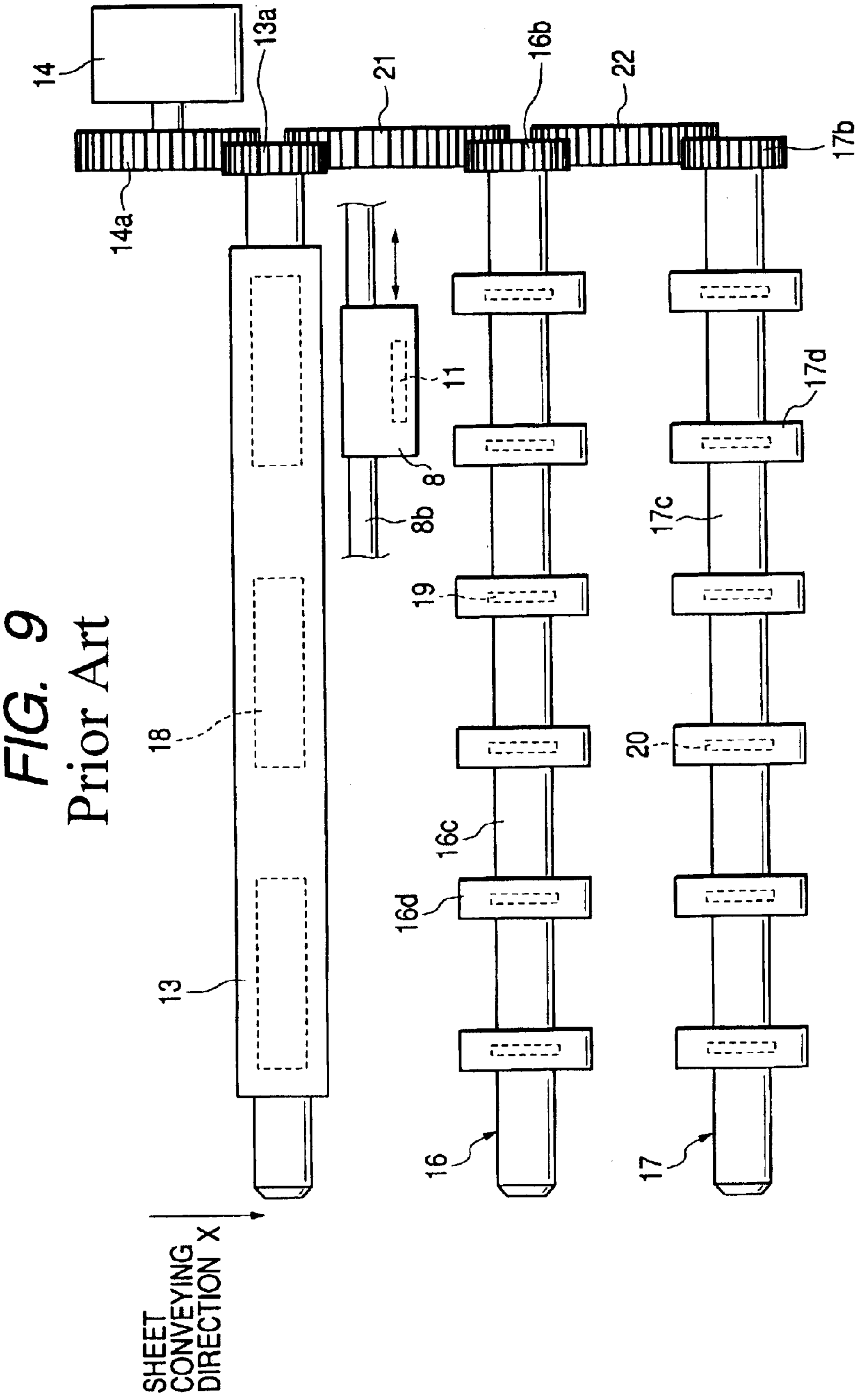
FIG. 9 Prior Art
FIG. 9 is a cross-sectional view that sows the conveying unit and discharging unit of the conventional recording apparatus.

Next, with reference to FIG. 4 to FIG. 7, the description will be made of the circumferential structure of the discharging roller in accordance with the present invention. Here, in FIG. 4 to FIG. 7, the same reference marks are applied to the same structural components as those appearing in FIG. 9.

The conveying unit 6 (FIG. 3) is provided with the conveying roller 13 for conveying the sheet P, and a platen 12 for setting a distance between the sheet P and the recording head 11. Also, with the conveying roller 13, the pinch roller 18 is in contact, which is driven to rotate by the frictional force exerted between the conveying roller 13 and the sheet P. The pinch roller 18 is biased to the conveying roller 13 by means of a spring member (not shown) so as to generate a force to convey the sheet P. Here, it is set for each of the pinch rollers 18 to give pressure of 500 gf to the conveying roller 13, respectively.

Also, the discharging unit 7 (FIG. 3) is arranged on the downstream of the recording head 11 in the direction X of recording sheet conveyance to discharge the sheet P after the completion of image recording, while effectuating the stabilized posture of the sheet P during image recording. The discharging unit 7 is formed by the sheet discharging device, which is formed by (1) the first discharging roller 16 and the second discharging roller 17 serving as recording sheet discharging means, for which two shafts (roller shafts) themselves are arranged in parallel to the conveying roller 13; (2) a first spur 19 and a second spur 20, which are plural rotatory bodies to be driven, while pressuring the sheet P; (3) the tray 10 that receives each of discharged sheets P and stack them; etc. The first discharging roller 16 and the second discharging roller 17 are fixed to the platen 12. Each of the discharging rollers 16 and 17 is a roller formed by a plurality of roller portions 16*d* and 17*d* arranged in the direction intersecting with the direction X of sheet conveyance, and the two discharging rollers 16 and 17 are arranged side by side in the direction X of sheet conveyance.

The tray 10 for receiving discharged sheets is arranged below the second discharging roller 17 so that it can stack a plurality of sheets P, each of which is discharged through the recording area.

In this respect, the conveying roller 13, the first discharging roller 16, and the second discharging roller 17 are substantially in the same height.

Next, the description will be made of the image recording operation of the recording apparatus thus structured.

The conveying roller 13 and the pinch roller 18 pinch and convey the sheet P, which is separated and fed by use of the feeding unit 5. Then, when the sheet P reaches the designated position of the platen 12 for image recording, the carriage 8 reciprocates by means of a carriage motor (not shown), and in accordance with signals from an electric circuit board (not shown), the recording head 11 discharges ink to the sheet P for recording images. Here, the discharging rollers 16 and 17 and the spur rollers 19 and 20 pinch the sheet P on the downstream side of the recording head 11 in the direction X of sheet conveyance, and the conveying roller 13 and the pinch roller 18 pinch the upstream side thereof to convey it for recording. Then, from the leading end to the trailing end of the sheet P, recording is made on the designated area. After that, the trailing end of the sheet P passes the conveying roller 13 and the pinch roller 18. Subsequently, only the discharging rollers 16 and 17 convey the sheet P. In this manner, it is possible for the recording head 11 to record up to the rear end limit of the sheet P.

Here, in accordance with the present embodiment, as shown in FIG. 4 the second discharging roller 17, which is the discharging roller on the downstream side of the two discharging rollers arranged side by side in the direction X of sheet conveyance, is structured to use metal (SUM 22 D+KN plating) for a shaft portion 17*c* and rubber (EPDM: hardness 70°) for a roller portion 17*d* that serves as the sheet conveying member. After the roller portion 17*d* is press-fitted to the shaft portion 17*c*, the roller portion 17*d* is polished to materialize the outer diameter precision of Φ15 mm±0.02 mm, and the runout precision of 0.05 mm for the roller portion 17*d*. The materialization of such precision is possible by the adoption of a highly stiffness metallic shaft with the roller portion to be polished. On the other hand, the first discharging roller 16 on the upstream side is structured to use resin (ABS) for a shaft portion 16*c*, and the thermoplastic elastomer (TPE: hardness 70°) for a roller portion 16*d*. The shaft portion 16*c* and the roller portion 16*d* are formed integrally for production. In this case, the outer diameter precision is Φ15 mm±0.2 mm and the runout precision of 0.3 mm for the roller portion 16*d*.

As described above, for the first discharging roller 16, inexpensive materials and method of manufacture are used, while adopting the second discharging roller 17 with the prior consideration given to the precision thereof. In this way, it is made possible to provide a sheet conveyance structure having a good balance in the conveyance precision of a sheet P and the cost performance thereof.

Further, as shown in FIG. 4 and FIG. 5, in accordance with the present embodiment, the driving force is transmitted from a motor gear 14*a* of the motor 14, which is arranged between the conveying roller 13 and the second discharging roller 17. The motor gear 14*a* and each of a conveying 13*a* and a gear portion 17*b* of the second discharging roller are connected for direct driving.

With the structure thus arranged, the conveyance precision of the second discharging roller 17, which dominantly determines the conveyance precision at the time of trailing end recording, is made highest among plural discharging rollers arranged side by side in the sheet conveying direction. In a case where plural discharging rollers are driven by one driving source, there exist inclusively other discharging roller gears between the driving source and the discharging roller so that the driving force is transmitted. In the structure of the present embodiment, it is arranged to transmit at the beginning the driving force from the driving source to the second discharging roller 17, which needs the highest conveyance precision, thereby significantly enhancing the conveyance precision at the time of recording on the trailing end portion of the sheet. This is because if the number of gears on the way is increased, there are inevitably influences exerted by the part precisions, such eccentricity of gears. Also, the accumulated amount of backlashes of gears causes unstable conveyance precision. The structure of the present embodiment, however, makes it possible to minimize them.

Also, the conveying roller 13 and the second discharging roller 17 share the driving source of one motor for use, and the sheet conveyance precision is improved reliably without const increase from that of the conventional structure.

Here, the motor 14 is arranged of necessity between the conveying roller 13 and the second discharging roller 17, and the motor 14 can be contained in the discharging unit, too. Consequently, it is possible to save the required space by the portion corresponding to the motor space as compared with the conventional structure (FIG. 9), in which the motor 14 is arranged on the upstream side of the main conveying roller 13 in the direction X of sheet conveyance.

Also, as shown in FIG. 6, if the speed reduction ratio of a motor should be made larger, double gear 40, which is a two-staged gear for speed reduction use, is provided between the conveying roller 13 and the second discharging roller 17, and then, the motor 14 is arranged to engage therewith for the purpose. In this case, too, the driving force from the driving source is transmitted in the first place to the second discharging roller 17, not to the first discharging roller 16. In this way, it is possible to materialize the structure that provides the best precision of sheet conveyance.

In this respect, as shown in FIG. 4, the driving force is transmitted to the first discharging roller 16 through an output gear 17*e* of the second discharging roller, the transmission gear 21, and a gear 16*b* of the first discharging roller.

Here, in conjunction with FIG. 7, the description will be made of the principle to secure an excellent conveyance precision of the sheet P with the aforesaid structure where the driving force is transmitted in the first place to the discharging roller on the outermost downstream side in a formation of plural discharging rollers being arranged in the sheet conveying direction.

As described earlier, the trailing end of a sheet P is conveyed by two discharging rollers 16 and 17 after it has passed the conveying roller 13, and the recording head 11 ejects ink to perform recording. As shown in FIG. 7, the state of the sheet P at this juncture is such that the portion beyond the second discharging roller 17 in the direction X of sheet conveyance hangs down downward from the second discharging roller 17. After that, it moves along the tray 10 for receiving discharged sheets.

In this state, the force is exerted on the trailing end of the sheet P in the direction in which such portion tends to float centering on the tangential line 17*a* of the second discharging roller 17 and the spur 20. This force is generated by the own weight of the sheet P and the firmness thereof. The spur 19 functions to keep the sheet P in good conveying condition by resisting such floating force to keep a distance between the sheet P and the ink ejection surface of the recording head 11. However, the pressure of the spur 19 to the first discharging roller 16 is reduced because the spur should provide resistance to the floating force. On the other hand, the sheet P is in contact with the second discharging roller 17 as it wraps in the circumferential direction of the roller by the own weight of the sheet P. Therefore, the conveying force of the second discharging roller 17 against the sheet P is extremely large, with the result that the ratio of influence exerted on the conveyance precision of the sheet P by the second discharging roller 17 becomes significantly large.

Now, as has been described above, it is reasonable to form the structure so as to arrange in high precision the discharging roller on the outermost downstream side, which has the greatest conveying force for the sheet P owning to the phenomenon of the kind.

In this respect, the spurs 19 and 20 are arranged to face each of the roller portions 16*d* and 17*d*, respectively, and arranged to give pressure of as comparatively small as 10 gf to each of the roller members by use of spring members (not shown). This arrangement is made so as to prevent the surface of the sheet P, on which images are recorded, from being spoiled, and keep images in good condition.

Table 1 shows the data obtained from the experiments for determining the structure hereof.

The precision of discharging roller on downstream side (1):

Outer diameter precision±0.02 mm

Runout precision 0.05 mm

The precision of discharging roller on downstream side (2):

Outer diameter precision±0.2 mm

Runout precision 0.3 mm

The precision of discharging roller on upstream side (3):

Outer diameter precision±0.02 mm

Runout precision 0.05 mm

The precision of discharging roller on upstream side (4):

Outer diameter precision±0.2 mm

Runout precision 0.3 mm

The numerical values listed on the table indicate the conveyance precision of a sheet P when the sheet P is conveyed at a pitch of 5 mm with each combination of precisions of discharging rollers on the upstream side and discharging rollers on the downstream side. (Numerical value at 3 σ: unit μm)

TABLE 1

| Sheet conveyance precision (μm) at 3σ (feed pitch of 5 mm) | | |
|---|---|---|
| Precision of discharging roller on | Precision of discharging roller on downstream side | |
| upstream side | (3) | (4) |
| (1) | ±12 | ±15 |
| (2) | ±35 | ±40 |

As understandable from the Table 1, the combination of discharging rollers on the upstream side and downstream side, the precisions of which are both enhanced, indicate the best result of±12 μm at 3 σ as a matter of course. However, only the precision of the discharging roller on the downstream side is enhanced as disclosed in the present embodiment makes it possible to secure±15 μm, which is the precision at almost the same level as the best result.

This has a great difference as compared with the result of±35 μm indicated by the combination of (2) and (3) where roller precision is attempted on the upstream side, and obviously, it is most effective to make the precision higher only for the discharging roller on the downstream side. Then, further, the driving force is transmitted earlier (or firstly) for the discharging roller on the outermost downstream, which is dominant with respect to the conveyance precision provided by a plurality of discharging roller lines, than other discharging rollers, whereby the influences that may be exerted by the eccentricity of gears and backlashes thereof can be minimized to make it possible to effectuate the sheet conveyance in high precision by use of a plurality of discharging roller lines.

In this respect, the "3 σ" is a value obtainable by multiplying the standard deviation σ by 3, and when a large-scale production is attempted, it is estimated that the ratio of good products arrives at 99.73% (within the numerical value of 3 σ). For that matter, this is a numerical value that serves as a target when products inspection is carried out.

As described above, in accordance with the present embodiment, there are provided the discharging roller 16, 17 and others for discharging the sheet P, and the motor 14 drives all the discharging rollers. In this structure, the driving force is provided first for the discharging roller 17 on the outermost downstream side in the direction of sheet conveyance, hence making it possible to enhance the conveyance precision when the sheet is conveyed only by plural discharging roller lines so as to provide printed images in good condition on the rear portion of the recording sheet P. Further, the motor 14, which is the driving source of the discharging rollers 16 and 17, is shared as a driving source for the conveying roller 13 that conveys the recording sheet to the recording area. In this way, it is made possible to attempt the enhancement of conveyance precision only by use of plural discharging rollers without any cost increase as compared with the conventional structure.

Also, a space saving is possible by arranging the motor 14 that serves as the driving source described earlier between the discharging roller 17 on the outermost downstream side in the direction of sheet conveyance and the conveying roller 13.

Also, the driving source of the discharging roller 17 on the outermost downstream side in the direction of recording sheet conveyance and the conveying roller 13 is directly connected for driving without intervention of the intermediate transmission gears 21, 22, and the like. With this arrangement, it becomes possible to attempt further the enhancement of sheet conveyance precision only by use of discharging roller, thus providing printed images in good condition on the rear portion of a recording sheet.

In this respect, the numerical values, materials, and the like are described in the present embodiment as example, and such numerical values, materials, and the like are not necessarily limited thereto.

Also, the discharging rollers are not necessarily limited to two rollers. The same effect is equally obtainable when discharging rollers are used in plural numbers more than two.

Second Embodiment

Figure 8:
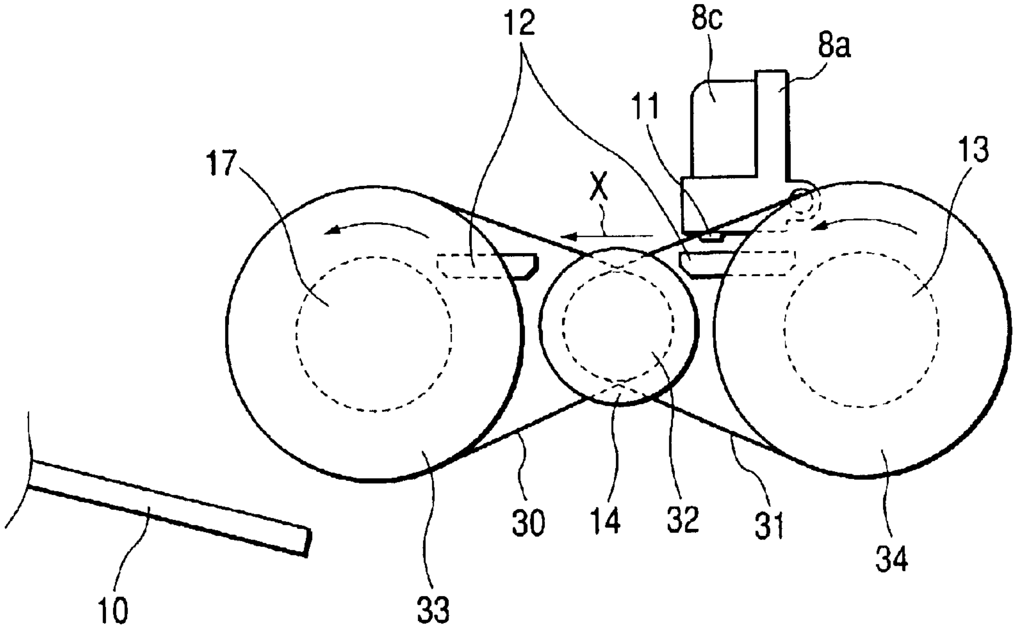
FIG. 8 is a cross-sectional view that shows the conveying unit and discharging unit of the recording apparatus in accordance with a second embodiment of the present invention.

FIG. 8 shows a second embodiment of the present invention. Here, with reference to FIG. 8, the description will be made of the structure different from that of the first embodiment.

In accordance with the first embodiment described above, gears are used as driving force transmission means from the motor 14 to each of the rollers, but as shown in FIG. 8, belts are used to transmit a force in the present embodiment.

In FIG. 8, a driving force is transmitted from a motor pulley 32, which is connected with the motor 14, to a discharging pulley 33, which is connected with the second discharging roller 17, through a discharging belt 30. To the conveying roller 13, driving force is transmitted by use of a conveying belt 31 and conveying pulley 34.

With the driving force transmission by use of belts, the backlash that occurs in use of gear driving is eliminated. Therefore, it becomes possible to materialize a higher precision of sheet conveyance than the first embodiment.

In this respect, the driving force transmission to the first discharging roller 16 is conducted through the output gear 17*e* of the second discharging roller 17, the transmission gear 21, and the first discharging roller gear portion 16*b* as shown in FIG. 4 in the same manner as the first embodiment. Also, the driving force transmission to the conveying roller 13 may be by use of gears.

In accordance with the mode thus arranged, the driving force transmission to the discharging roller 17 on the outermost downstream side in the direction of sheet conveyance is effectuated using the belt 30 to make it possible to enhance more the conveyance precision of sheet only by use of the discharging rollers, thus providing printed images in good condition on the rear portion of a recording head.

As described above, in accordance with the present embodiment, a recording apparatus, in which a plurality of discharging roller for discharging a recording sheet is provided in the direction of recording sheet conveyance, and then, with one driving source, the plural discharging rollers are driven, transmits the driving force first to the discharging roller on the outermost downstream side in the direction of recording sheet conveyance. In this way, the conveyance precision is enhance when the recording sheet is conveyed only by use of discharging rollers, thus making it possible to provide printed images in good condition on the rear end portion of the recording sheet. Further, the driving source of the aforesaid plural discharging rollers is shared for use as the driving source for the conveying roller that conveys a recording sheet to the recording area, whereby it becomes possible to attempt the enhancement of the sheet conveyance precision by use of only discharging rollers without any increase of cost as compared with the conventional structure.

Also, a space saving is attempted by arranging the aforesaid driving source between the discharging roller on the outmost downstream side in the direction of a recording sheet conveyance and the aforesaid conveying roller.

Also, the driving source of the conveying roller and the discharging roller on the outermost downstream side in the direction of recording sheet conveyance are directly connected without any intervention of intermediate driving force transmission means. In this way, it is possible to enhance more the sheet conveyance precision only by use of discharging rollers, hence providing printed images in good condition on the rear end portion of a recording sheet.

What is claimed is:

1. A recording apparatus for recording on a recording sheet by recording means, comprising:

a conveying roller for conveying a recording sheet on the upstream side of said recording means in the recording sheet conveying direction;

plural discharging rollers for conveying a recording sheet on the downstream side of said recording means in the recording sheet conveying direction; and a common driving source for driving said plural discharging rollers;

wherein the driving force of said driving source is transmitted first to a discharging roller on the outermost downstream side in the recording sheet conveying direction.

2. A recording apparatus according to claim 1, wherein said conveying roller is also driven by the driving source for driving said plural discharging rollers.

3. A recording apparatus according to claim 2, wherein said driving source is arranged between said discharging roller on the outermost downstream side in the recording sheet conveying direction and said conveying roller.

4. A recording apparatus according to claim 1, wherein said driving source and said discharging roller on the outermost downstream side is directly connected without any intervention of intermediate driving force transmission means.

5. A recording apparatus according to claim 1, wherein a belt is used as the driving force transmission means from said driving source to said discharging roller on the outermost downstream side.

6. A recording apparatus according to claim 1, wherein a rotational member rotatable according to said conveying roller is provided.

7. A recording apparatus according to claim 1, further comprising a tray for stacking discharged recording sheets on the downstream side of said plural discharging rollers in the recording sheet conveying direction.

8. A method for driving plural discharging rollers arranged in a conveying direction of a recording sheet, by one driving source, so as to discharge the recording sheet from a predetermined area, said method comprising:

a first step of transmitting a driving force from the driving source to the discharging roller on the outermost downstream side in the sheet conveying direction; and a second step of transmitting the driving force transmitted to the discharging roller on the outermost downstream side, from the discharging roller on the outermost downstream side to another discharging roller.

9. A method according to claim 8, wherein said driving source drives a conveying roller for conveying the recording sheet to the predetermined area.

10. A recording apparatus for recording on a recording sheet by recording means, comprising:

a conveying roller for conveying a recording sheet in a predetermined conveying direction;

plural discharging rollers for discharging a recording sheet, said plural discharging rollers being arranged on the downstream side of the conveying roller in the conveying direction;

a driving source;

a first transmitting means for transmitting a driving force from the driving source to a discharging roller on the outermost downstream side in the conveying direction; and a second transmitting means for transmitting the driving force from the driving source to a discharging roller other than the discharging roller on the outermost downstream side, wherein said recording means executes recording between said conveying roller and the plural discharging rollers, and a number of transmitting members intervening in said second transmitting means is greater than that of transmitting members intervening in said first transmitting means.

11. A recording apparatus according to claim 10, wherein said transmitting member includes a gear.

12. A recording apparatus according to claim 10, wherein the discharging roller on the outermost downstream side is higher in conveyance precision than another discharging roller.

13. A recording apparatus according to claim 10, wherein the discharging roller on the outermost downstream side is higher in diameter precision than another discharging roller.

14. A recording apparatus according to claim 10, wherein the discharging roller on the outermost downstream side is less in eccentricity than another discharging roller.

15. A recording apparatus according to claim 10, wherein said plural discharging rollers can contact with an under surface of the recording sheet, and plural rotatable members are provided to press the recording sheet onto the plural discharging rollers, respectively.

16. A recording apparatus according to claim 10, wherein said first and second transmitting means commonly use at least one of the transmitting members.

17. A recording apparatus for recording on a recording sheet by recording means, comprising:

a conveying roller for conveying a recording sheet in a predetermined conveying direction;

plural discharging rollers for discharging a recording sheet, said plural discharging rollers being arranged on the downstream side of the conveying roller in the conveying direction;

a driving source;

a first transmitting means for transmitting a driving force from the driving source to a discharging roller on the outermost downstream side in the conveying direction; and a second transmitting means for transmitting the driving force transmitted by said first transmitting means to a discharging roller other than the discharging roller on the outermost downstream side, wherein said recording means executes recording between said conveying roller and the plural discharging rollers.

18. A recording apparatus according to claim 17, wherein the discharging roller on the outermost downstream side is higher in conveyance precision than another discharging roller.

19. A recording apparatus according to claim 17, wherein the discharging roller on the outermost downstream side is higher in diameter precision than another discharging roller.

20. A recording apparatus according to claim 17, wherein the discharging roller on the outermost downstream side is less in eccentricity than another discharging roller.

21. A recording apparatus according to claim 17, wherein said plural discharging rollers can contact with an undersurface of the recording sheet, and plural rotatable members are provided to press the recording sheet onto the plural discharging rollers, respectively.

22. A recording apparatus for recording on a recording sheet by recording means, comprising:

a conveying roller for conveying a recording sheet in a predetermined conveying direction;

a first discharging roller for discharging a recording sheet, said first discharging roller being arranged on the downstream side of the conveying roller in the conveying direction;

a second discharging roller for discharging a recording sheet, said second discharging roller being arranged on the outermost downstream side in the conveying direction;

a motor;

a first transmitting means for transmitting a driving force from said motor to said second discharging roller; and a second transmitting means for transmitting the driving force from said motor to said first discharging roller;

wherein said recording means executes recording between said conveying roller and said first discharging roller, and a number of transmitting members intervening in said second transmitting means is greater than that of transmitting members intervening in said first transmitting means.

23. A recording apparatus according to claim 22, wherein said transmitting member includes a gear.

24. A recording apparatus according to claim 22, wherein said second discharging roller is higher in conveyance precision than the first discharging roller.

25. A recording apparatus according to claim 22, wherein the second discharging roller is higher in diameter precision than the first discharging roller.

26. A recording apparatus according to claim 22, wherein the second discharging roller is less in eccentricity than the first discharging roller.

27. A recording apparatus according to claim 22, wherein said first and second discharging rollers can contact with an under surface of the recording sheet, and first and second rotatable members are provided to press the recording sheet onto the first and second discharging rollers, respectively.

28. A recording apparatus according to claim 22, wherein said first transmitting means comprises a motor gear of the motor, and a second discharging roller gear position of the second discharging roller, for mating with the motor gear of the motor.

29. A recording apparatus according to claim 28, wherein said second transmitting means comprises an output gear of the second discharging roller, and a transmission gear for mating with the output gear, and a first discharging roller gear portion for mating with the transmission gear.

* * * * *

UNITED STATES PATENT AND TRADEMARK OFFICE

CERTIFICATE OF CORRECTION

PATENT NO. : 6,909,447 B2 
DATED : June 21, 2005
INVENTOR(S) : Koichiro Kawaguchi et al.

It is certified that error appears in the above-identified patent and that said Letters Patent is hereby corrected as shown below:

Column 2,
Line 51, “sows” should read -- shows --.

Column 3,
Line 3, “that” should read -- view that --.

Column 5,
Line 21, “stiffness” should read -- stiff --.
Line 37, “down” should be deleted.
Line 60, “such” should read -- such as --.
Line 67, “const” should read -- cost --.

Column 9,
Line 10, “enhance” should read -- enhanced --.

Signed and Sealed this

First Day of November, 2005

JON W. DUDAS
*Director of the United States Patent and Trademark Office*

US006909447C1

(12) EX PARTE REEXAMINATION CERTIFICATE (6404th)

United States Patent

Kawaguchi et al.

(10) Number: US 6,909,447 C1

(45) Certificate Issued: Aug. 26, 2008

(54) RECORDING APPARATUS

(75) Inventors: Koichiro Kawaguchi, Kanagawa (JP); Noriyuki Sugiyama, Kanagawa (JP)

(73) Assignee: Canon Kabushiki Kaisha, Ohta-ku, Tokyo (JP)

Reexamination Request:
No. 90/008,399, Jan. 3, 2007

Reexamination Certificate for:

| | |
|---|---|
| Patent No.: | **6,909,447** |
| Issued: | **Jun. 21, 2005** |
| Appl. No.: | **10/214,586** |
| Filed: | **Aug. 9, 2002** |

Certificate of Correction issued Nov. 1, 2005.

(30) Foreign Application Priority Data

Aug. 10, 2001 (JP) ....................................... 2001-243503

(51) Int. Cl.

| | |
|---|---|
| ***G01D 15/24*** | (2006.01) |
| ***B41J 2/325*** | (2006.01) |
| ***B41J 11/00*** | (2006.01) |

(52) U.S. Cl. ........................... 347/218; 347/104; 347/16

(58) Field of Classification Search ........................ None
See application file for complete search history.

(56) References Cited

FOREIGN PATENT DOCUMENTS

JP 8-267856 10/1996

*Primary Examiner*—Beverly M. Flanagan

(57) ABSTRACT

A recording apparatus for recording on a recording sheet by recording means comprises a conveying roller for conveying a recording sheet on the upstream side of recording means in the recording sheet conveying direction, plural discharging rollers for conveying a recording sheet on the downstream side of recording means in the recording sheet conveying direction, and a common driving source for driving the plural discharging rollers. For this recording apparatus the driving force of the driving source is transmitted first to a discharging roller on the outermost downstream side in the recording sheet conveying direction. With the structure thus arranged, this recording apparatus is capable of forming images in good condition on the rear portion of a recording sheet by enhancing the conveyance precision only by use of discharging rollers without any significant cost increase for a recording apparatus provided with plural discharging rollers.

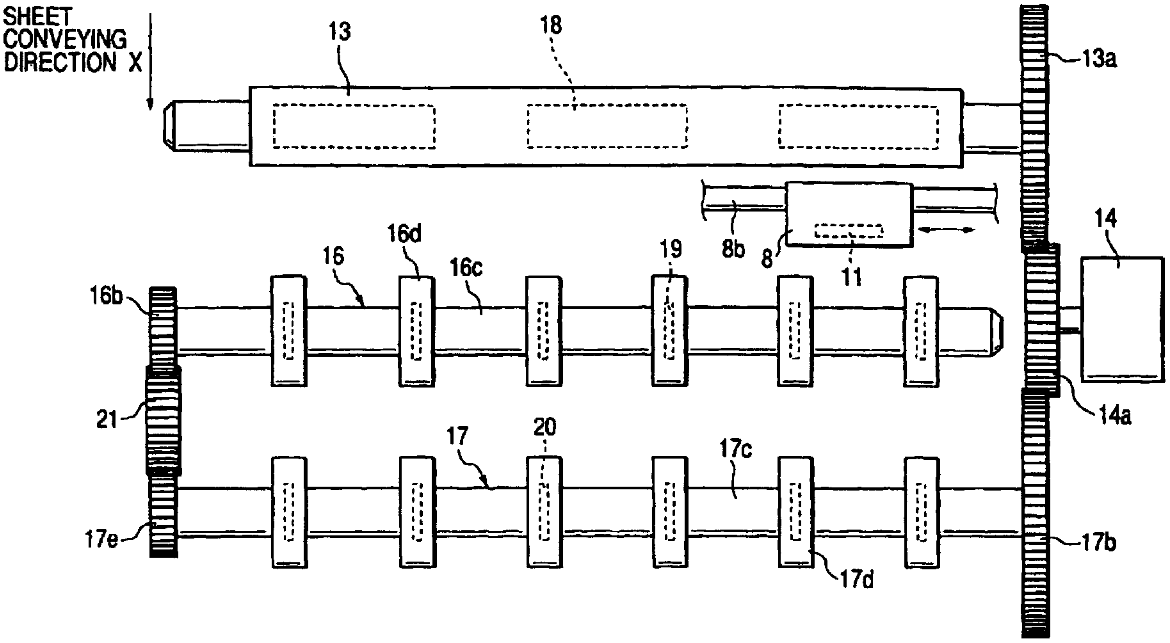

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 8, 10, 17 and 22 are determined to be patentable as amended.

Claims 2–7, 9, 11–16, 18–21 and 23–29, dependent on an amended claim are determined to be patentable.

New claims 30–33 are added and determined to be patentable.

1. A recording apparatus for recording on a recording sheet by recording means, comprising:

a conveying roller for conveying a recording sheet on the upstream side of said recording means in the recording sheet conveying direction;

plural discharging rollers for conveying a recording sheet on the downstream side of said recording means in the recording sheet conveying direction;

a common driving source for driving said plural discharging rollers; *and*

*driving force transmission means for transmitting a driving force from said common driving source to said conveying roller without intervention of driving force transmitting members which integrally rotate together with said plural discharging rollers;* wherein the driving force of said *common* driving source is transmitted first to a discharging roller on the outermost downstream side in the recording sheet conveying direction.

8. A method for driving *a conveying roller and* plural discharging rollers arranged in a conveying direction of a recording sheet, by one driving source, so as to discharge the recording sheet from a predetermined area, said method comprising:

*a first step of transmitting a driving force from said common driving source to the conveying roller without intervention of driving force transmitting members which integrally rotate together with the plural discharging rollers;* a [first] *second* step of transmitting a driving force from the driving source to the discharging roller on the outermost downstream side in the sheet conveying direction; and a [second] *third* step of transmitting the driving force transmitted to the discharging roller on the outermost downstream side, from the discharging roller on the outermost downstream side to another discharging roller.

10. A recording apparatus for recording on a recording sheet by recording means, comprising:

a conveying roller for conveying a recording sheet in a predetermined conveying direction;

plural discharging rollers for discharging a recording sheet, said plural discharging rollers being arranged on the downstream side of the conveying roller in the conveying direction;

a driving source;

a first transmitting means for transmitting a driving force from the driving source to a discharging roller on the outermost downstream side in the conveying direction; and a second transmitting means for transmitting the driving force from the driving source to a discharging roller other than the discharging roller on the outermost downstream side[.]*;*

*third transmitting means for transmitting the driving force from the driving source to the conveying roller;* wherein said recording means executes recording between said conveying roller and the plural discharging rollers, and a number of transmitting members intervening in said second transmitting means is greater than that of transmitting members intervening in said first transmitting means*, and*

*wherein a number of transmitting members intervening in said second transmitting means is greater than that of transmitting members intervening in said third transmitting means.*

17. A recording apparatus for recording on a recording sheet by recording means, comprising:

a conveying roller for conveying a recording sheet in a predetermined conveying direction;

plural discharging rollers for discharging a recording sheet, said plural discharging rollers being arranged on the downstream side of the conveying roller in the conveying direction;

a driving source;

a first transmitting means for transmitting a driving force from the driving source to a discharging roller on the outermost downstream side in the conveying direction; and a second transmitting means for transmitting the driving force transmitted by said first transmitting means to a discharging roller other than the discharging roller on the outermost downstream side[,]*;*

*a third transmitting means for transmitting the driving force from the driving source to said conveying roller without the intervention of said second transmitting means;* wherein said recording means executes recording between said conveying roller and the plural discharging rollers.

22. A recording apparatus for recording on a recording sheet by recording means, comprising:

a conveying roller for conveying a recording sheet in a predetermined conveying direction;

a first discharging roller for discharging a recording sheet, said first discharging roller being arranged on the downstream side of the conveying roller in the conveying direction;

a second discharging roller for discharging a recording sheet, said second discharging roller being arranged on the outermost downstream side in the conveying direction;

a motor;

a first transmitting means for transmitting a driving force from said motor to said second discharging roller; and a second transmitting means for transmitting the driving force from said motor to said first discharging roller;

*a third transmitting means for transmitting the driving force from the driving source to said conveying roller;* wherein said recording means executes recording between said conveying roller and said first discharging roller, and a number of transmitting members intervening in said second transmitting means is greater than that of transmitting members intervening in said first transmitting means*, and*

*wherein a number of transmitting members intervening in said second transmitting means is greater than that of transmitting members intervening in said third transmitting means.*

*30. A recording apparatus for recording on a recording sheet by recording means, comprising:*

*a conveying roller for conveying a recording sheet in a predetermined conveying direction;*

*a first discharging roller for discharging a recording sheet, said first discharging roller being arranged on a downstream side of the conveying roller in the conveying direction;*

*a second discharging roller for discharging a recording sheet, said second discharging roller being arranged on an outermost downstream side in the conveying direction;*

*a motor;*

*a first transmitting means for transmitting a driving force from said motor to said second discharging roller;*

*a second transmitting means for transmitting the driving force from said motor to said first discharging roller; and*

*a third transmitting means for transmitting the driving force from the driving source to said conveying roller;*

*wherein said third transmission means transmits the driving force to said conveying roller so that the conveyance precision by said conveying roller may be higher than that by said first discharging roller, and said second transmission means transmits the driving force to said second discharge roller so that the conveyance precision by said second discharge roller may be higher than that by said first discharging roller.*

*31. A recording apparatus according to claim 30, wherein each of said first transmitting means, said second transmitting means and said third transmitting comprises a gear.*

*32. A recording apparatus for recording on a recording sheet be recording means, comprising:*

*a conveying roller for conveying a recording sheet in a predetermined conveying direction;*

*a plurality of discharging rollers for discharging a recording sheet, said plurality of discharging rollers being arranged on a downstream side of the conveying roller in the conveying direction;*

*a motor;*

*an output gear rotatable in synch with an output axis of said motor;*

*first transmission means having first driving force transmitting member receiving the driving force of said output rotational member for transmitting the driving force to said conveying rollers;*

*second transmission means having second driving force transmitting member receiving the driving force of said output rotational member for transmitting the driving force to the outermost downstream one of said discharge rollers in the conveying direction; and*

*third transmission means for transmitting the driving force transmitted by said second transmission means to the discharge rollers other than the outermost downstream discharge roller in the conveying direction.*

*33. A recording apparatus according to claim 32, wherein each of the first driving force transmitting member and the second driving force transmitting member comprises a gear.*

* * * * *